US010412429B1

United States Patent
Lee et al.

(10) Patent No.: US 10,412,429 B1
(45) Date of Patent: *Sep. 10, 2019

(54) PREDICTIVE TRANSMITTING OF VIDEO STREAM DATA

(71) Applicant: Amazon Technologies, Inc., Seattle, WA (US)

(72) Inventors: Alexandra Elizabeth Baoboe Lee, Seattle, WA (US); William Alexander Strand, Sammamish, WA (US); Joel William Weisman, Seattle, WA (US); Christopher Samuel Zakian, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/446,304

(22) Filed: Mar. 1, 2017

Related U.S. Application Data

(63) Continuation of application No. 14/866,773, filed on Sep. 25, 2015, now Pat. No. 9,621,926.

(51) Int. Cl.
*G06F 17/30* (2006.01)
*H04N 21/43* (2011.01)
(Continued)

(52) U.S. Cl.
CPC ......... *H04N 21/2408* (2013.01); *H04L 67/18* (2013.01); *H04L 67/28* (2013.01);
(Continued)

(58) Field of Classification Search
None
See application file for complete search history.

(56) References Cited

U.S. PATENT DOCUMENTS 6,005,643 A * 12/1999 Morimoto ............. G06T 1/0085
375/240.26
6,742,033 B1 * 5/2004 Smith ............... G06F 17/30902
707/E17.12
(Continued)

FOREIGN PATENT DOCUMENTS

WO WO-2004051443 A1 * 6/2004 ............. G06F 21/10

OTHER PUBLICATIONS

U.S. Appl. No. 14/866,773, "Notice of Allowance", dated Jan. 27, 2017, 13 pages.

*Primary Examiner* — Nasser M Goodarzi
*Assistant Examiner* — Terrika Peterson
(74) *Attorney, Agent, or Firm* — Kilpatrick Townsend & Stockton LLP

(57) ABSTRACT

Techniques are described for providing a predictive data streaming service associated with a visual media file. For example, third type of frame data for a visual media file may be transmitted to a client device from a streaming service. In embodiments, a selection of the particular visual media file may be transmitted to the streaming service. A request may be made to an interface associated with the client device, via an application program interface call, for a first data stream of a first type of frame data and a second data stream of a second type of frame data for the particular visual media file. The request may be based at least in part on the selection of the particular visual media file and after receipt of the third type of frame data. The third type of frame data, the first data stream of the first type of frame data, and the second data stream of the second type of frame data may be interleaved based at least in part on instructions from the interface.

19 Claims, 10 Drawing Sheets

(51) Int. Cl.
*H04N 5/76* (2006.01)
*H04L 29/08* (2006.01)
*H04N 21/24* (2011.01)
*H04N 21/25* (2011.01)
*H04N 21/6336* (2011.01)
*H04N 21/234* (2011.01)
*H04N 19/127* (2014.01)

(52) U.S. Cl.
CPC ....... *H04N 21/251* (2013.01); *H04N 21/6336* (2013.01); *H04L 67/06* (2013.01)

(56) References Cited

U.S. PATENT DOCUMENTS

| | | | |
|---|---|---|---|
| 9,621,926 B1 * | 4/2017 | Lee | H04N 21/234 |
| 2005/0025250 A1 * | 2/2005 | Linzer | H04N 19/127 |
| | | | 375/240.25 |
| 2008/0152016 A1 * | 6/2008 | Nagahara | H04N 5/76 |
| | | | 375/240.26 |
| 2008/0301300 A1 | 12/2008 | Toub | |
| 2011/0206121 A1 * | 8/2011 | Takada | H04N 19/00 |
| | | | 375/240.12 |
| 2012/0289147 A1 | 11/2012 | Raleigh et al. | |
| 2013/0150015 A1 | 6/2013 | Valkó et al. | |
| 2013/0346483 A1 * | 12/2013 | Alstad | H04L 29/0809 |
| | | | 709/203 |
| 2014/0372511 A1 * | 12/2014 | Kapadia | H04L 67/02 |
| | | | 709/203 |
| 2015/0172619 A1 | 6/2015 | Yang et al. | |
| 2016/0191985 A1 * | 6/2016 | Tirpak | H04N 21/4331 |
| | | | 725/46 |

* cited by examiner

PREDICTIVE TRANSMITTING OF VIDEO STREAM DATA

CROSS-REFERENCE TO RELATED APPLICATIONS

This application is a Continuation of U.S. patent application Ser. No. 14/866,773, filed on Sep. 25, 2015, and entitled "PREDICTIVE TRANSMITTING OF VIDEO STREAM DATA," the content of which is herein incorporated by reference in its entirety.

BACKGROUND

Current network technologies provide a number of beneficial services to users of the Internet and other networks. For example, using the Internet, users are able to search, view, and/or order a number of items from electronic marketplaces. Further, users may be able to access, view, and/or interact with one or more movies or TV shows offered by a content streaming service. However, depending on each individual user's computer hardware and network environment, streaming or downloading content can be a time consuming and frustrating endeavor. A user's viewing experience may be mined or stifled due to slow download speeds or lack of buffering performed by the content streaming service on behalf of the user.

BRIEF DESCRIPTION OF THE DRAWINGS

Various embodiments in accordance with the present disclosure will be described with reference to the drawings, in which.

DETAILED DESCRIPTION

Figure 1:
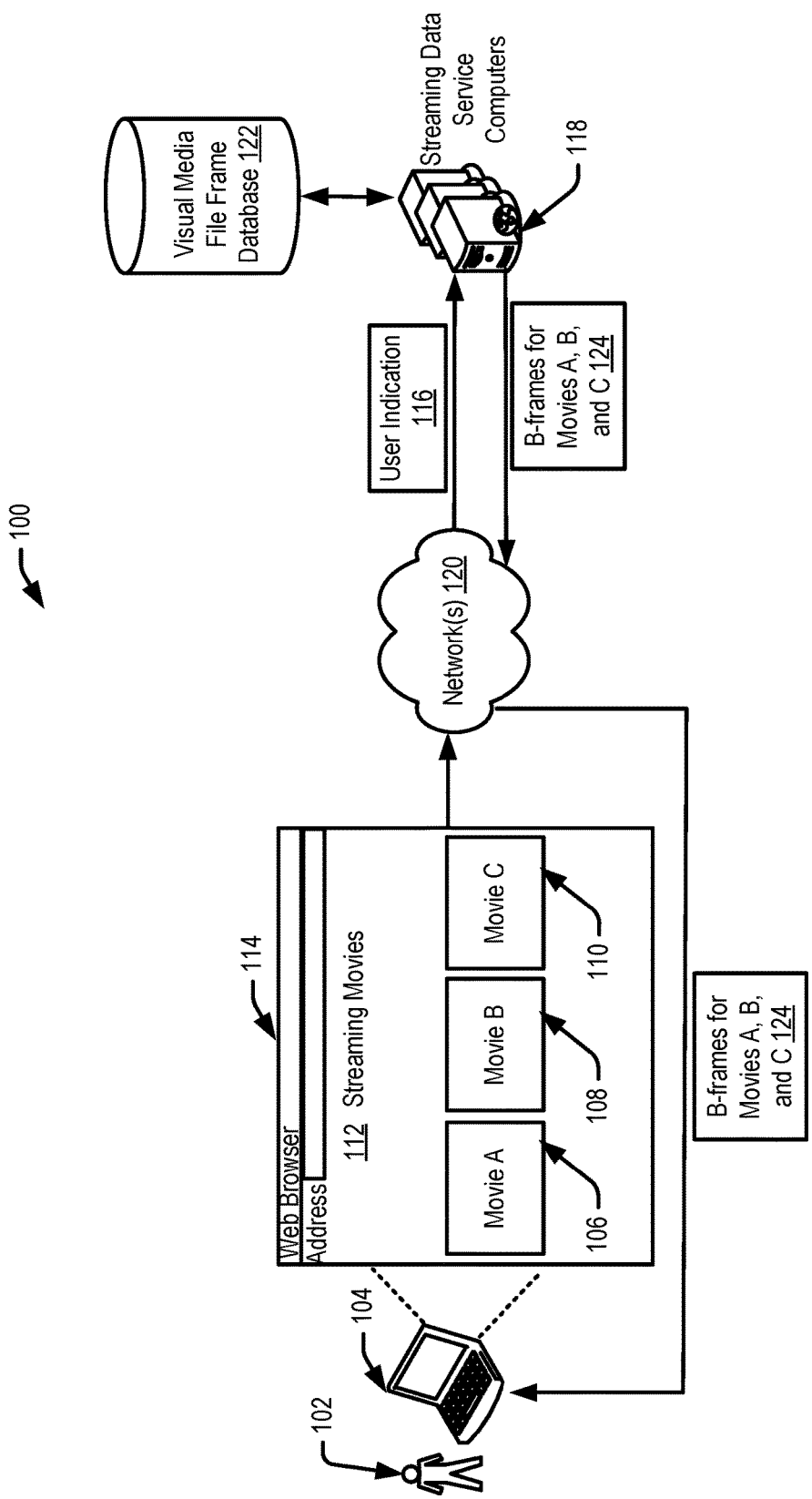
FIG. 1 illustrates an example data flow for a streaming data service, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to providing an enhanced user viewing experience by pre-fetching portions of a visual media file on behalf of a user. Specifically, a streaming data service may maintain portions (e.g., bi-predictive inter frames (B-frames), intra frames (I-frames), and predictive inter frames (P-frames)) of a plurality of visual media files that are compressed according to an H.264 compression standard. The portions of the plurality of media files may correspond to a first type of frame that is a self-contained frame that is configured to be independently decoded without reference to other images, a second type of frame that makes reference to parts of earlier first type or second type frames to decode an image or frame, and a third type of frame that makes reference to both an earlier reference frame (first or second type frames) and a future frame (first or second type of frames). The streaming data service may transmit the B-frames for a particular visual media file to a user's computing device based at least in part on an indication that the user is interested in the particular visual media file. The user's computing device or associated visual media file player/application requires the associated I-frames and P-frames in order to present the particular visual media file as the B-frames reference an earlier reference frame and a future frame of the particular visual media file. By pre-fetching the B-frames for the particular visual media file on behalf of the user, the download time for the other components (I-frames and P-frames) for the particular visual media file may be decreased and the presentation of the particular visual media file may be increased as the total download payload for the visual file is minimized.

In a non-limiting example, a user may interact with or scroll through, via an application on their mobile phone, a top ten selection of movies offered by a data streaming service. The data streaming service may transmit the B-frames for each movie of the top ten movies to the mobile phone for local storage. In some embodiments, the data streaming service may transmit the I-frames and P-frames of a selected movie subsequent to receiving a selection of the movie by the user. For example, the user may select the movie by clicking a download now or play user interface button provided by the application. The data streaming service may transmit instructions to the application or mobile phone indicating how to interleave the locally stored B-frame for the selected movie and the I-frames and P-frames for the selected movie. The interleaved movie may be presented to the user via the application for their viewing pleasure. As the user views the movie, the application queries the data streaming service for the appropriate I-frames and P-frames and accesses the locally stored B-frames according to the interleaving instructions. Thus, the user enjoys a faster download of the assets required to play the movie as the data streaming service need only transmit the I-frames and P-frames for interleaving by the application.

In accordance with at least one embodiment, the streaming data service may pre-fetch or transmit the B-frames based at least in part on an indication from a computing device associated with a user. For example, an indication may include a user interacting with a particular visual media file presented via an application or web browser (scrolling to or clicking on the visual media file, playing or selecting a trailer for a visual media file, input/output (I/O) activity, web browser history, user search activity). In some examples, the indication may include a user device connecting or authenticating with a network or wireless network. In an embodiment, the B-frames may be transmitted to a device associated with a user that is not the device that the indication or user indication was derived from. In embodiments, the streaming data service may transmit the B-frames for one or more visual media files to a user's computing device without receiving an indication. For example, the streaming data service may transmit the B-frames for one or more visual media files based on other factors such as a top list of visual media files, a recommended list of visual media files for a particular user, or recently trending visual media files. In some embodiments, the data streaming service may utilize shared dictionary compression over HyperText Transfer Protocol (SDCH) for the portions of the visual media files (B-frames, I-frames, and P-frames) to increase transmit speed for a selected visual media file and the components that comprise the selected visual media file.

In an embodiment, the streaming data service may generate and transmit interleaving instructions that indicate how to interleave the various frames that comprise a selected visual media file for presentation to the user. The interleaving instructions may indicate an order for the frames to be requested or accessed for presenting the selected visual media file. In accordance with at least one embodiment, the data streaming service may provide a software interface that can be queried or accessed by a computing device associated with a user. The software interface may provide a front-end that is accessible by the user's computing device via an application program interface (API) call for accessing the I-frame data streams or P-frame data streams provided by the data streaming service. The front-end of the software interface may be compliant with API calls that are known to the requesting software or correspond to particular data requests associated with visual media file players. The software interface is configured to respond to requests from a user's computing device as though it were the source of the frame streams. The software interface's back-end may be configured to receive the I-frames and P-frames from the data streaming service and interleave the frames with the pre-fetched B-frames for provision to the user's computing device via the front-end in response to a data access request.

FIG. 1 illustrates an example data flow 100 for a streaming data service, according to embodiments. The data flow 100 of FIG. 1 includes a user 102 utilizing a computing device 104 to interact with one or more movies (106-110). The user 102 may interact with the movies 106-110 via a web page 112 presented with a web browser 114. In accordance with at least one embodiment, an interaction of the user 102 with the movies 106-110 may comprise a user indication 116 that can be transmitted to streaming data service computers 118 via available networks 120. For example, the user 102 may have selected a trailer associated with movie A 106, had significant mouse activity with movie B 108, or read details for movie C 110. The activity of the user 102 may be provided as a user indication 116 to the streaming data service computers 118 via the networks 120. In embodiments, the streaming data service computers 118 may maintain portions (B-frames, I-frames, and P-frames) for a plurality of movies including movies 106-110 in a visual media file frame database 122.

In an embodiment, in response to receiving the user indication 116 the streaming data service computers 118 may transmit B-frames 124 for movies 106-110 to the computing device 104 via available networks 120. As described herein, the B-frames 124 for movies 106-110 are provided to the computing device 104 without the users 102 knowledge and are available, upon being interleaved with the appropriate I-frames and P-frames, for use in presenting a movie to the user 102. It should be appreciated that although FIG. 1 illustrates the user 102 interacting with the movies 106-110 with the computing device 104, in embodiments the user 102 may interact and the user indication 116 may be transmitted based at least in part on activity with an application associated with a content provider service.

Figure 2:
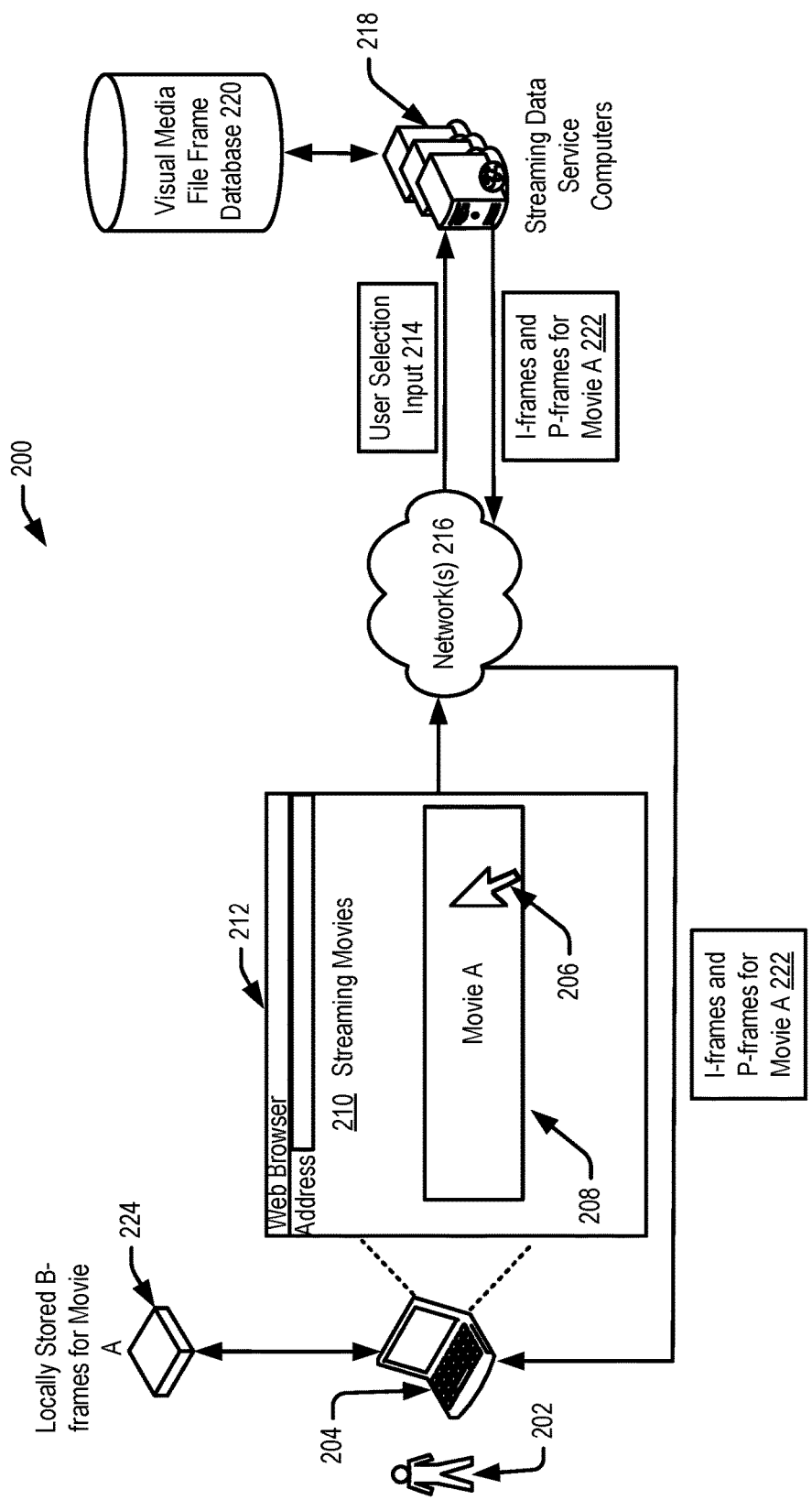
FIG. 2 illustrates an example data flow for a streaming data service, according to embodiments.

FIG. 2 illustrates an example data flow 200 for a streaming data service, according to embodiments. The data flow 200 of FIG. 2 includes a user 202 utilizing a computing device 204 to select 206 movie A 208. The selection 206 of movie A 208 may be performed via a web page 210 presented via a web browser 212 that is provided with the computing device 204. The user selection input 214 of movie A 208 may be provided via an available network 216 to streaming data service computers 218. In an embodiment, the streaming data service computers 218 may maintain portions (B-frames, I-frames, and P-frames) for a plurality of movies including movie A 206 in a visual media file frame database 220. In accordance with at least one embodiment, the streaming data service computers 218 may transmit the I-frames and P-frames 222 for movie A 208 to the computing device 204 in response to the user selection input 214. The I-frames and P-frames 222 for movie A 208 may be transmitted via the available networks 216. The computing device 204 may, in embodiments, have previously received and stored the B-frames 224 for movie A 208 for local storage. For example, the streaming data service computers 218 may have transmitted the B-frames 224 for movie A 208 to the computing device 204 in response to receiving an indication from the computing device 204 and the user 202. In an embodiment, the computing device 204 can interleave the B-frames 224 and the I-frames and P-frames 222 for movie A 208 to present a compiled or decompressed version of movie A 208 to the user 202.

Figure 3:
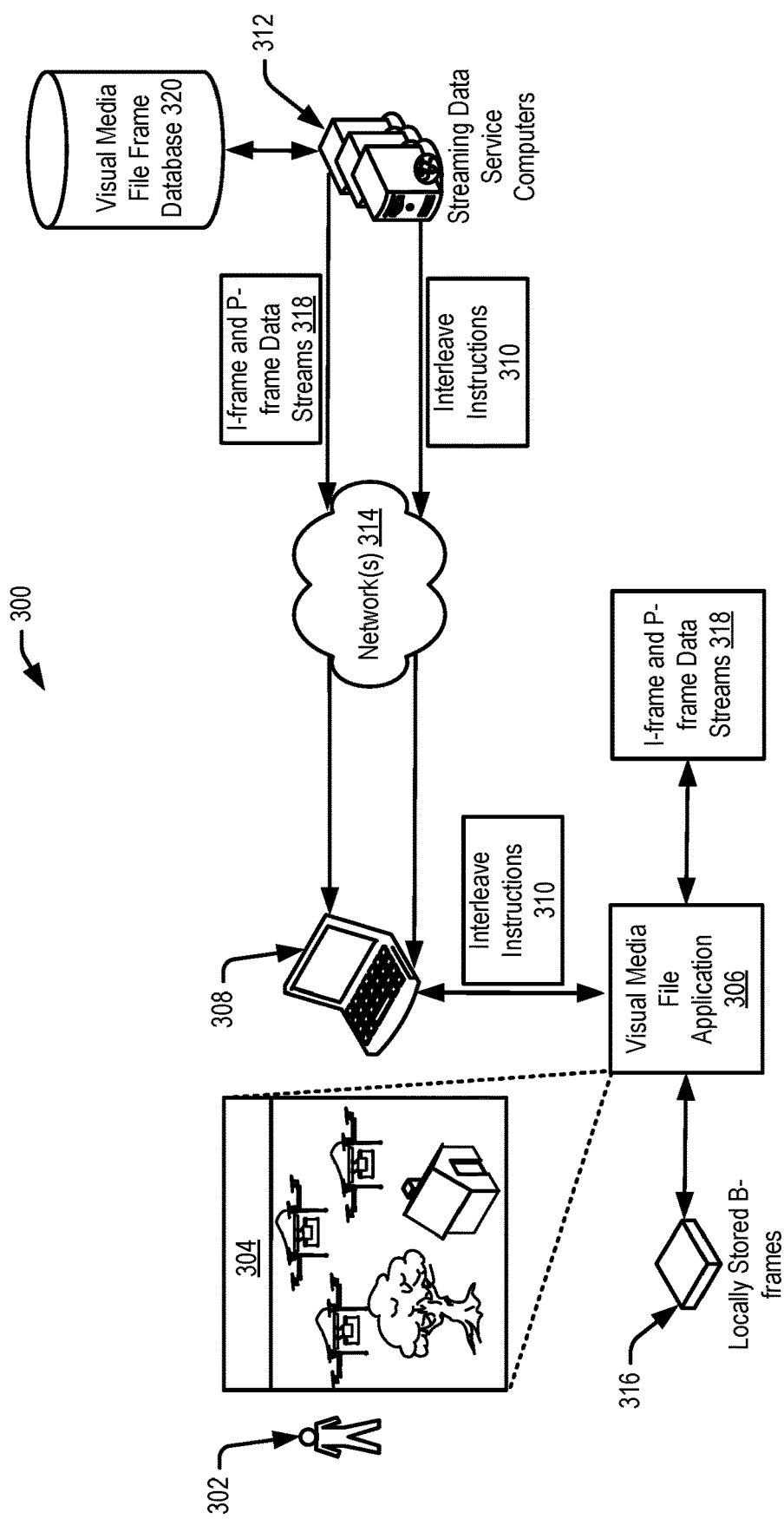
FIG. 3 illustrates an example data flow for a streaming data service, according to embodiments.

FIG. 3 illustrates an example data flow 300 for a streaming data service, according to embodiments. The data flow 300 of FIG. 3 includes a user 302 viewing a movie (attack of the killer drones) 304 presented by a visual media file application 306 on a computing device 308. The visual media application 306 may present a compiled or uncompressed version of the movie 304 based at least in part on interleave instructions 310 that are generated and transmitted by the streaming data service computers 312 via networks 314. The interleave instructions 310 may indicate how to interleave locally stored B-frames 316 for the movie 304 and received I-frame and P-frame data streams 318 for movie 304 that are transmitted by the streaming data service computers 312. In accordance with at least one embodiment, the streaming data service computers 312 may maintain portions (B-frames, I-frames, and P-frames) for a plurality of movies including movie 304 in a visual media file frame database 320.

The I-frame and P-frame data streams 318 may be transmitted in real time to the computing device 308 and visual media file application 306 to support streaming of movie 304 or transmitted asynchronously with respect to the previously provided B-frames 316 to support downloading of movie 304. In an embodiment, the interleave instructions 310 may include particular instructions for decompressing and arranging the B-frames 316 and I-frame and P-frame data streams 318 of movie 304 to suitable present movie 304 to the user 302. The streaming data service computers 312 may generate and transmit unique interleave instructions for a plurality of visual media files associated with the streaming data service computers 312. It should be appreciated that although FIG. 3 illustrates the computing device 308 and visual media file application 306 accessing the B-frames 316 from local storage, the computing device 308, visual media application 306, or other suitable components for presenting a visual media file may access the B-frames 316 from local memory or hard drive storage, remote storage, or from a proxy storage location.

Figure 4:
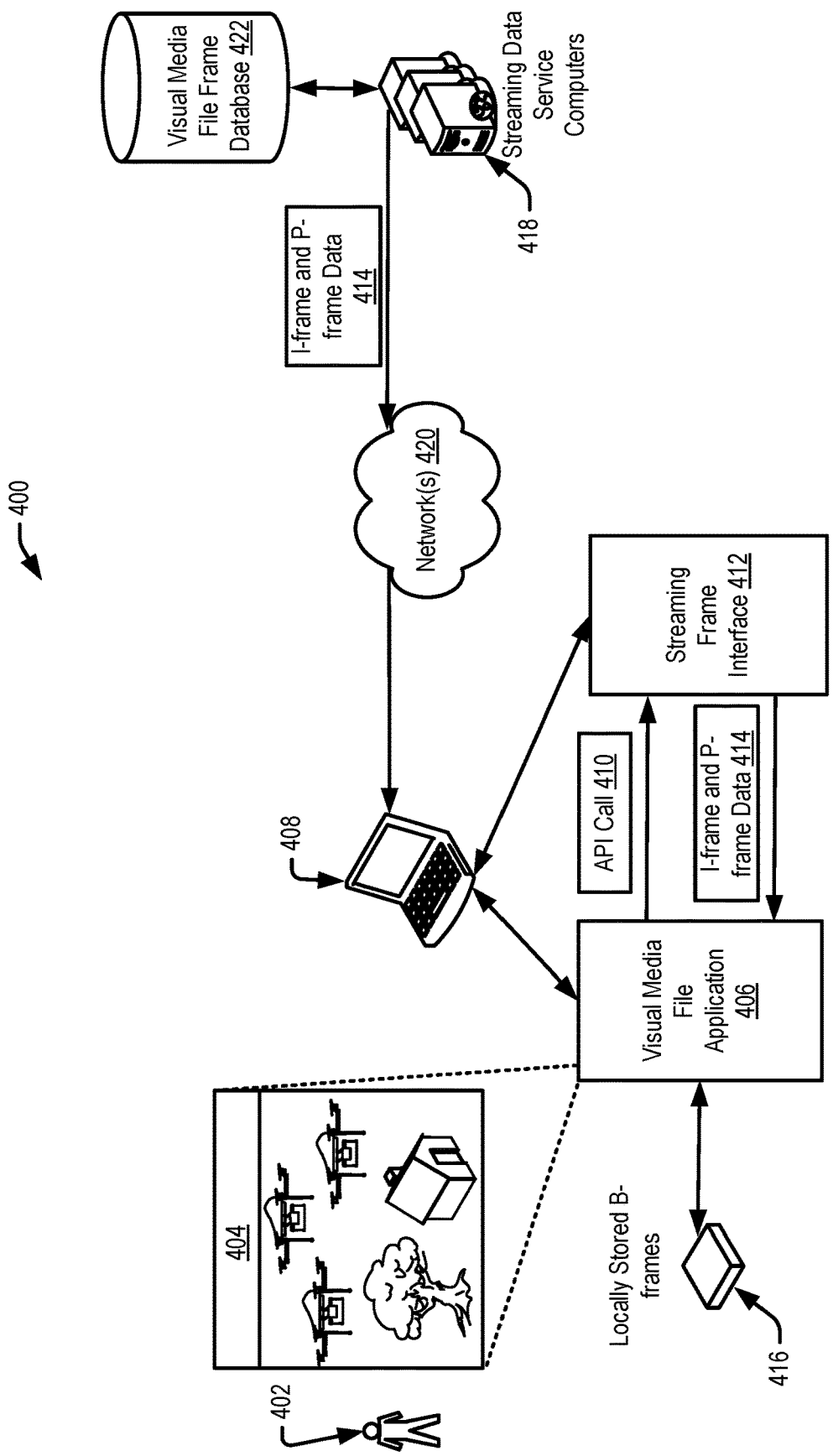
FIG. 4 illustrates an example data flow for a streaming data service, according to embodiments.

FIG. 4 illustrates an example data flow 400 for a streaming data service, according to embodiments. The data flow 400 of FIG. 4 illustrates a user 402 viewing a movie (attack of the killer drones) 404 presented by a visual media file application 406 on a computing device 408. The visual media application 406 may present a compiled or uncompressed version of the movie 404 based at least in part on an API call 410 to a streaming frame interface 412. In embodiments, the streaming frame interface 412 may provide or grant access to the I-frame and P-frame data 414 for movie 404 in response to the API call 410. In accordance with at least one embodiment, the visual media file application 406 may interleave the I-frame and P-frame data 414 and the locally stored B-frames 416 for movie 404 to present an uncompressed or compiled version of movie 404 to the user 402.

In embodiments, the streaming data service computers 418 may provide the I-frame and P-frame data 414 via an available network 420 to the computing device 408 and streaming frame interface 412. In some embodiments, the B-frames 416 may have been previously transmitted to the computing device 408 for local storage in response to receiving an indication of interest in the movie 404 from the user 402 as described herein. As illustrated in FIG. 4, the visual media file application 406 requests the required data (I-frame and P-frame data 414) from the streaming frame interface 412 as though the interface 412 were the source of the data or the streaming data service computers 418. The visual media file application 406 can utilize known function calls, API calls, or other suitable communications associated with the visual media file application 406 to request data without knowledge of transmitted steam data. In accordance with at least one embodiment, the streaming frame interface 412 may provide interleave instructions to the visual media file application 406 when providing the I-frame and P-frame data 414. In accordance with at least one embodiment, the streaming data service computers 418 may maintain portions (B-frames, I-frames, and P-frames) for a plurality of movies including movie 404 in a visual media file frame database 422.

Figure 5:
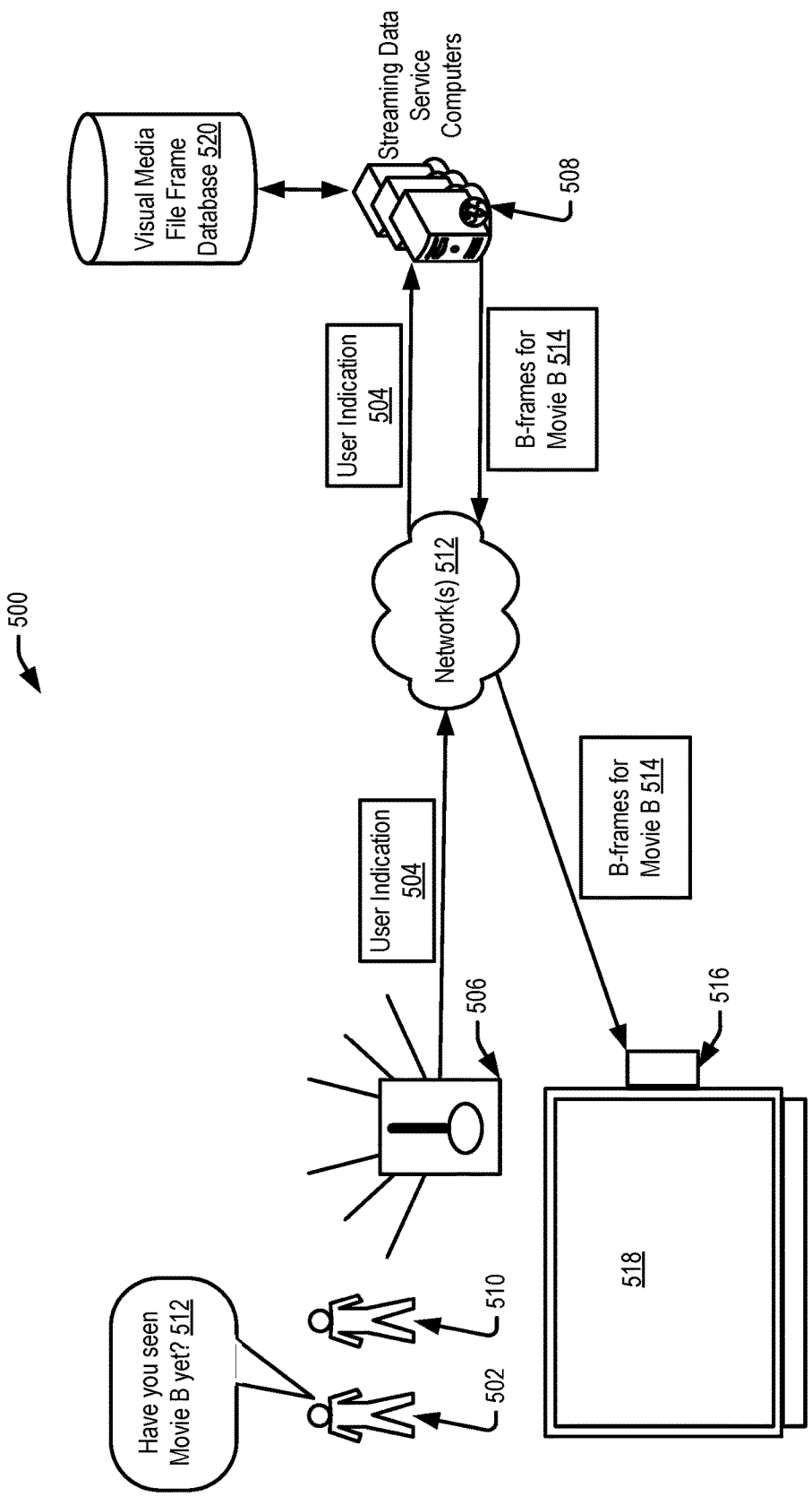
FIG. 5 illustrates an example data flow for a streaming data service including an audio interface, according to embodiments.

FIG. 5 illustrates an example data flow 500 for a streaming data service including an audio interface, according to embodiments. The data flow 500 of FIG. 5 illustrates a user 502 providing an audio indication (user indication 504) via audio interface 506 to streaming data service computers 508. For example, the user 502 may be speaking with another person 510 about movie B 512. In response to hearing particular key words or recognized words (512), the audio interface 506 may provide the user indication 504 to the streaming data service computers 508 via an available network 512. In accordance with at least one embodiment, the streaming data service computers 508 may provide B-frames 514 for movie B 512 to a storage device 516 associated with a television 518 that belongs to the user 502. The B-frames 514 for movie B 512 transmitted to the storage device 516 may be utilized at a later time by a content streaming application to more efficiently download and present movie B 512 to the user 502 as part of movie B 512 has already been transmitted to the storage device 516. In a non-limiting example, after the user 502 has talked about movie B 512 and later decides to watch movie B 512, an enhanced viewing experience may be provided as some assets have been pre-fetched without the user's active input or knowledge. When the user 502 selects to watch movie B 512 the other assets (I-frames and P-frames for movie B 512) will comprise a smaller download payload that can be communicated faster than a payload that comprises all three components (B-frames, I-frames, and P-frames) for movie 512. The streaming data service computers 508 may be in communication with a visual media file frame database 520 to access and transmit the B-frames for Movie B 514 as described herein.

Figure 6:
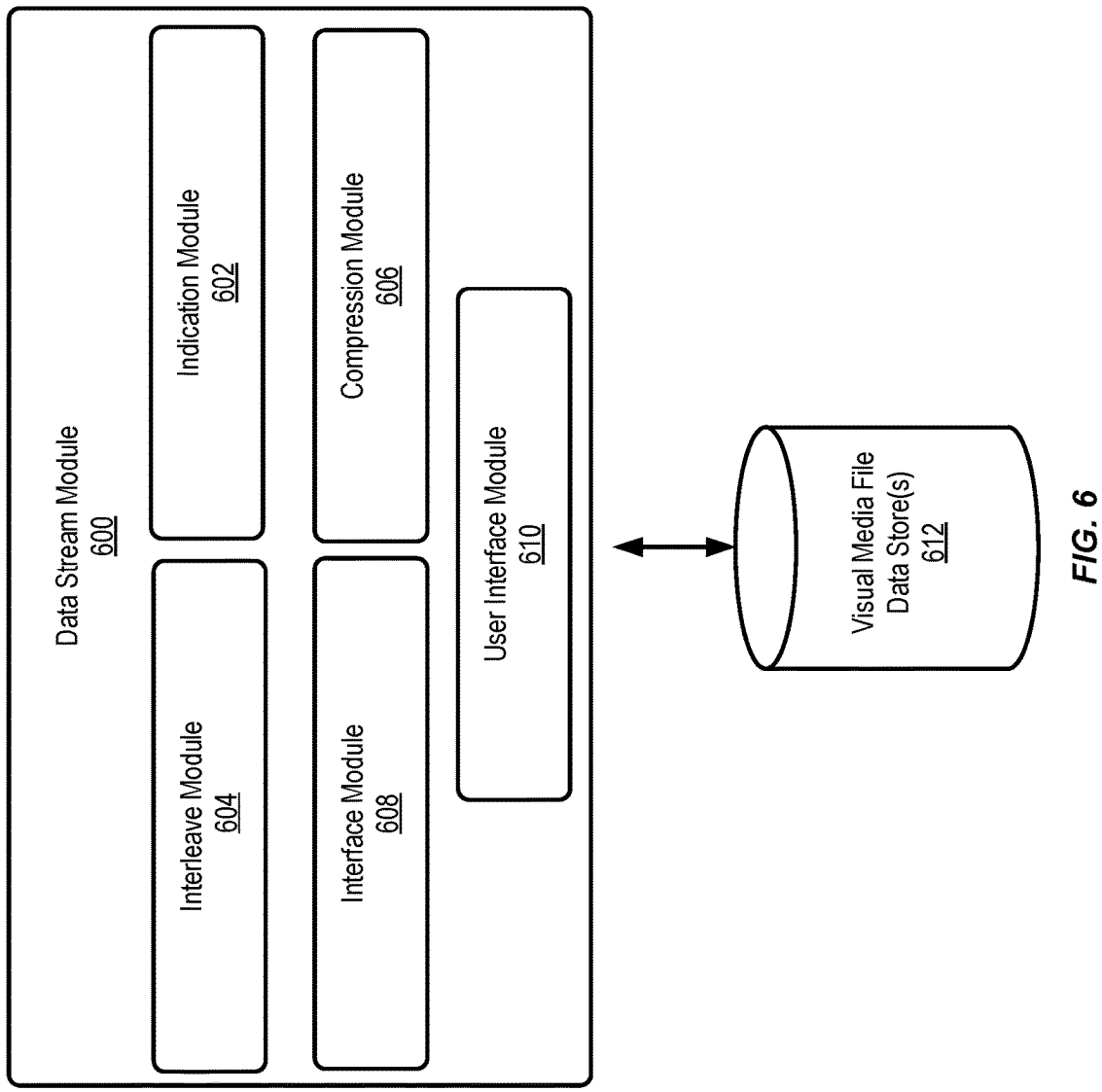
FIG. 6 illustrates an example data stream module, according to embodiments.

FIG. 6 illustrates an example data stream module 600, according to embodiments. In accordance with at least one embodiment, the data stream module 600 may include an indication module 602, an interleave module 604, a compression module 606, an interface module 608, and a user interface module 610 in communication with a visual media file data store 612. The modules included within and including the data stream module 600 may be software modules, hardware modules or a suitable combination thereof. If the modules are software modules, the modules can be embodied on a non-transitory computer readable medium and processed by a processor in any of the computer systems described herein. It should be noted that the described processes and architectures described below can be performed either in real-time or in an asynchronous mode prior to any user interaction. The modules may be configured in the manner suggest in FIG. 6 or may exist as separate modules.

In accordance with at least one embodiment, the data stream module 600 may be configured to transmit B-frames for one or more visual media files to a computing device in response to an indication as described herein. In some embodiments, the data stream module 600 may be configured to transmit P-frames and I-frames for one or more visual media files to a computing device in response to a user selection of a particular visual media file as described herein. The data stream module 600 may transmit the B-frames to a computing device based on one or more factors associated with the user, the visual media file itself, or other suitable factors maintained by the streaming data service described herein. In an embodiment, the data stream module 600 may encrypt B-frames before transmittal of the B-frames to a computing device. The B-frames may be encrypted according to suitable encryption techniques that utilize the appropriate I-frames and P-frames for a corresponding visual media file to decrypt. In embodiments, the data stream module 600 may generate and transmit a decryption key according to a public/private key pairing that corresponds to the encrypted B-frames. The decryption key may be provided in response to a user selection of a particular visual media file.

In accordance with at least one embodiment, the indication module 602 may be configured to map user provided input to indications of interest that are utilized to transmit B-frames for a visual media file that corresponds to the user input. The indication module 602 may be configured to map factors associated with a visual media file that serve as a trigger to start transmitting B-frames for a visual media file. For example, the factors associated or maintained for visual media files may include being in a recommended list, being within a particular position within a top visual media file list, information indicating trending or popular visual media files. The indication module 602 may provide data to the data stream module 602 to transmit B-frames for a visual media file based at least in part on information for a particular user such as user preferences. The indication module 602 may utilize information associated with a particular user that is maintained by an electronic marketplace such as user purchase history or recommendation confidence ratings that are compared to a threshold. For example, a particular recommendation generated by an electronic marketplace may have a confidence rating of 9 that must meet or exceed a threshold of 8 before B-frames are provided for a visual media file included in the recommendation. In an embodiment, the indication module 602 may maintain and utilize client specific indicators to provide B-frames. For example, a computing device utilizing a web browser may provide an indication from mouse movement whereas a mobile device may be limited to providing input that corresponds to a cardinal direction navigation paradigm.

In accordance with at least one embodiment, the interleave module 604 may be configured to generate interleave instructions that indicate how to decompress and arrange the B-frames, I-frames, and P-frames for a visual media file and present the visual media file. The interleave module 604 may be configured to transmit the interleave instructions for the visual media file to a computing device or to a service provided interface that is configured to run on the computing device as described herein. The interleave module 604 may generate and transmit unique interleave instructions for each visual media file of a plurality of visual media files. In embodiments, the interleave module 604 may transmit instructions that utilize a frame buffer to aid in decompressing the B-frames, I-frames, and P-frames in a proper arrangement for a visual media file. For example, the interleave module 604 may encode or associate a frame rate or other metadata that can be utilized to appropriately arrange the frames for a visual media file. The interleave module 604 may include instructions that indicate utilizing different buffers for each frame type based on the frame rate or metadata associated with each frame.

In accordance with at least one embodiment, the compression module 606 may be configured to utilize additional compression techniques, such as utilizing an SDCH, for objects or common frames included in the B-frames. For example, for several vectors that are the same across B-frames, a dictionary that corresponds to the SDCH compression may be provided to a computing device. The dictionary provided to the computing device could be unique to each visual media file or include data that could be utilized for one or more visual media files. The dictionary associated with SDCH compression could also be utilized to maintain information for objects in a scene, and the vectors associated with the objects that take similar movements over time. By utilizing the SDCH compression, the amount of information associated with or the number of B-frames may be reduced before transmitting to a computing device, client, or user. In an embodiment, the compression module 606 may be configured to tag or associate metadata to each frame that indicates the location in a finished data stream for a visual media file as described herein. The compression module 606 may be configured to generate a hash from the metadata associated with the B-frames that can be utilized to verify the location of the B-frames in the finished data stream for the visual media file.

In accordance with at least one embodiment, the interface module 608 may be configured to generate and transmit a software interface that is configured to respond to API calls from visual media file player applications. The software interface acts as an intermediary that receives disjointed I-frames and P-frames for a particular media file, interleaves the frames with previously stored B-frames, and responds to the API calls as though it were the source of the data (data stream service computers), as described herein. In an embodiment, the software interface is configured to provide received I-frame data streams and P-frame data streams to requesting entities on behalf of the data stream service computers. In accordance with at least one embodiment, the user interface module 610 may be configured to provide a user interface that is configured to present one or more visual media files for streaming, download, or rental. The user interface may also be configured to receive and transmit indications and selection derived from user input as described herein. The user interface module 610 may transmit a user interface associated with a content provider that is configured to present decompressed or compiled visual media files to a user via a computing device. In an embodiment, the user interface module 610 may utilize location information of associated with the user and/or the user device to determine a first location of a requesting entity and a proximately close proxy server to provide B-frames to the requesting entity. An example of location information may include GeoIP, suitable network based location awareness technologies, or global positioning system (GPS) information. In some embodiments, the B-frames are provided by the data streaming service computers to a proxy server that is proximately near a particular user rather than providing the B-frames directly to the computing device of the particular user. In an embodiment, portions of the B-frames are provided directly to the computing device of the particular user and other portions of the B-frames are provided to the proxy server near the user utilizing the GPS information.

Figure 7:
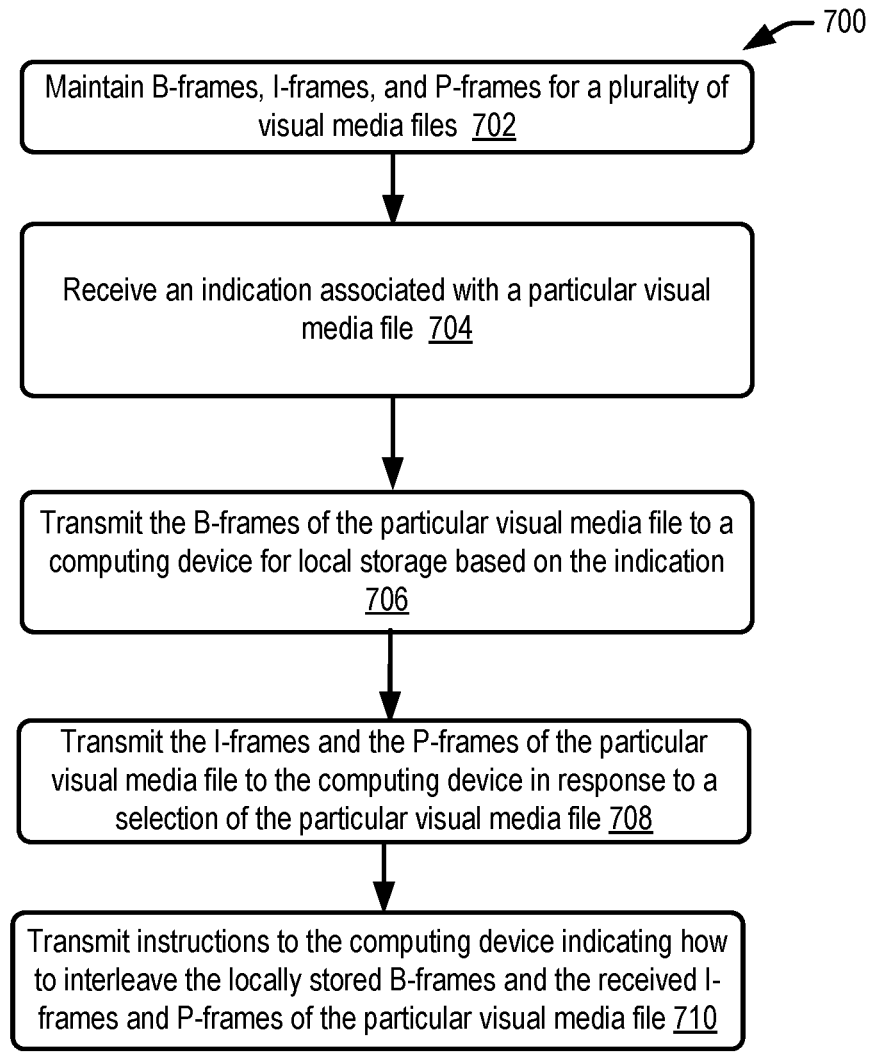
FIG. 7 illustrates an example flow diagram for a streaming data service, according to embodiments.
Figure 8:
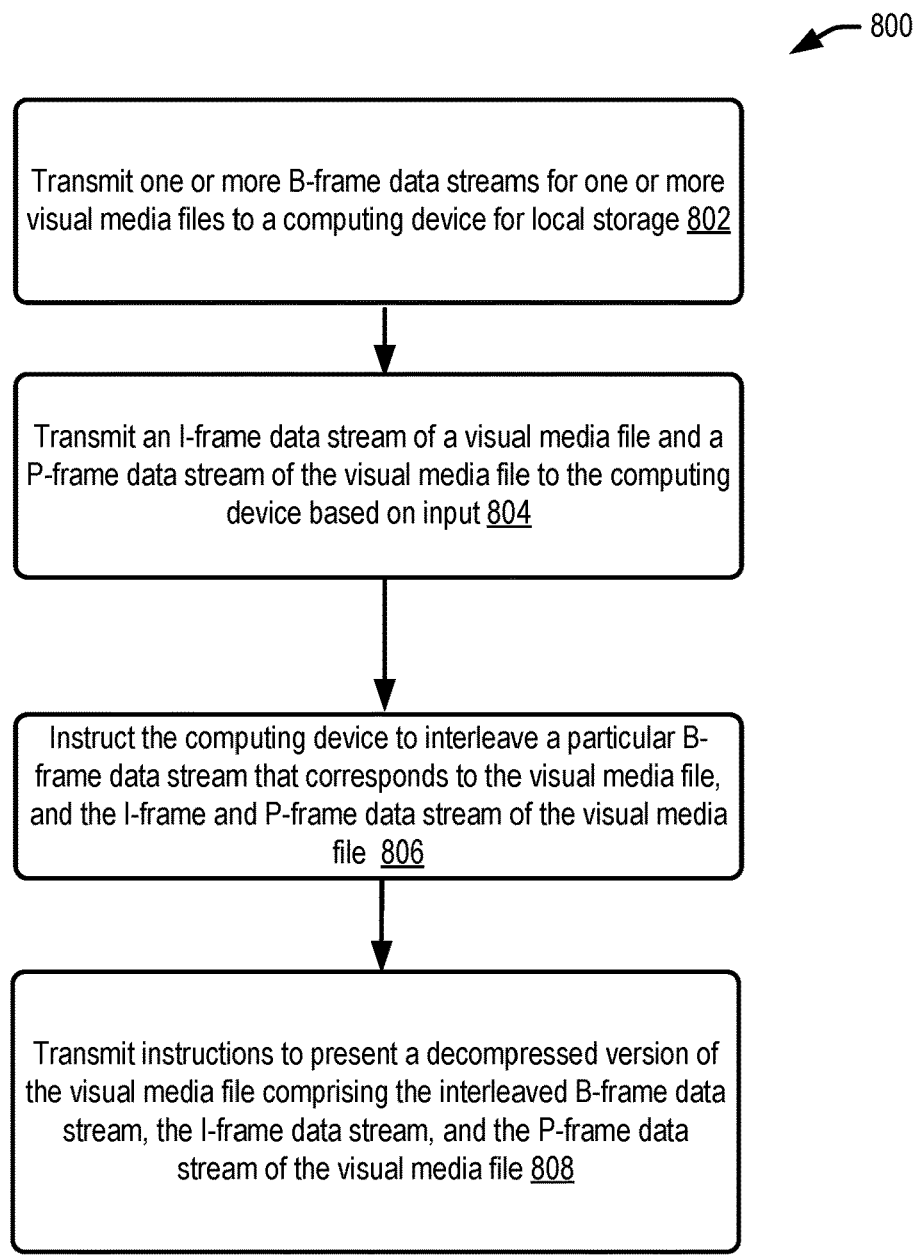
FIG. 8 illustrates an example flow diagram for a streaming data service, according to embodiments.

FIGS. 7 and 8 illustrate example flow diagrams for a streaming data service, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processor, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the process (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. As noted below, the code may be stored on a computer-readable storage medium, for example, in the form of a computer program including a plurality of instructions executable by one or more processors. The computer-readable storage medium may be non-transitory.

In some examples, one or more stream data service computers (e.g., utilizing at least one of a data stream module 600, an indication module 602, an interleave module 604, a compression module 606, an interface module 608, and a user interface module 610 in communication with a visual media file data store 612) shown in FIG. 6 may perform the processes 700 and 800 of FIGS. 7 and 8. In FIG. 7, the process 700 may include maintaining B-frames, I-frames, and P-frames for a plurality of visual media files at 702. The frames for each visual media file may be compressed according to an H.264 compression technique resulting in the visual media file being separated into B-frames, I-frames, and P-frames. The process 700 may include receiving an indication associated with a particular visual media file at 704. For example, a user may provide mouse movement that corresponds to the particular visual media file that can be interpreted as an indication, or a user may select a trailer of the particular visual media file that can be interpreted as an indication.

The process 700 may include transmitting the B-frames of the particular visual media file to a computing device for local storage based at least in part on the indication at 706. In some examples, a portion of the B-frames for the particular visual media file may be transmitted based at least in part on the indication thereby reducing the eventual download payload associated with the particular visual media file. The process 700 may include transmitting the I-frames and the P-frames of the particular visual media to the computing device in response to a selection of the particular visual media file at 708. For example, a user may have selected a rent, play, or download UI button presented via a graphical user interface on the computing device indicating their interest in viewing the particular visual media file. The process 700 may conclude at 710 by transmitting instructions to the computing device indicating how to interleave the locally stored B-frames and the received I-frames and P-frames of the particular visual media file. In some embodiments the interleave instructions may be unique to the particular visual media file.

In FIG. 8 the process 800 may include transmitting one or more B-frame data streams for one or more visual media files to a computing device for local storage at 802. As described herein, the B-frame data stream may be locally stored, remotely stored via a proxy storage or other suitable remote storage mechanism, or stored in volatile memory associated with the computing device. The process 800 may include transmitting an I-frame data stream and P-frame data stream of the visual media file to the computing device based at least in part on input from the computing device at 804. In some embodiments, instructions may be provided by the data stream service computers to one or more third party computers for providing I-frame data streams and P-frame data streams associated with a plurality of visual media files. The process 800 may include instructing the computing device to interleave a particular B-frame data stream that corresponds to the visual media file, and the I-frame and P-frame data stream of the visual media file at 806. In embodiments, the interleave instructions indicate how to decompress the various data streams and arrange the frames included in each data stream to present an ordered and decompressed version of the visual media file to a user. The process 800 may conclude at 808 by transmitting instructions to present a decompressed version of the visual media file comprising the interleaved B-frame data stream, the I-frame data stream, and the P-frame data stream of the visual media file. As described herein, the presentation of the decompressed version of the visual media file may be based at least in part on metadata associated with each frame that can be utilized to appropriately order the frames and their relationships with one another in the complete and decompressed version of the visual media file.

Figure 9:
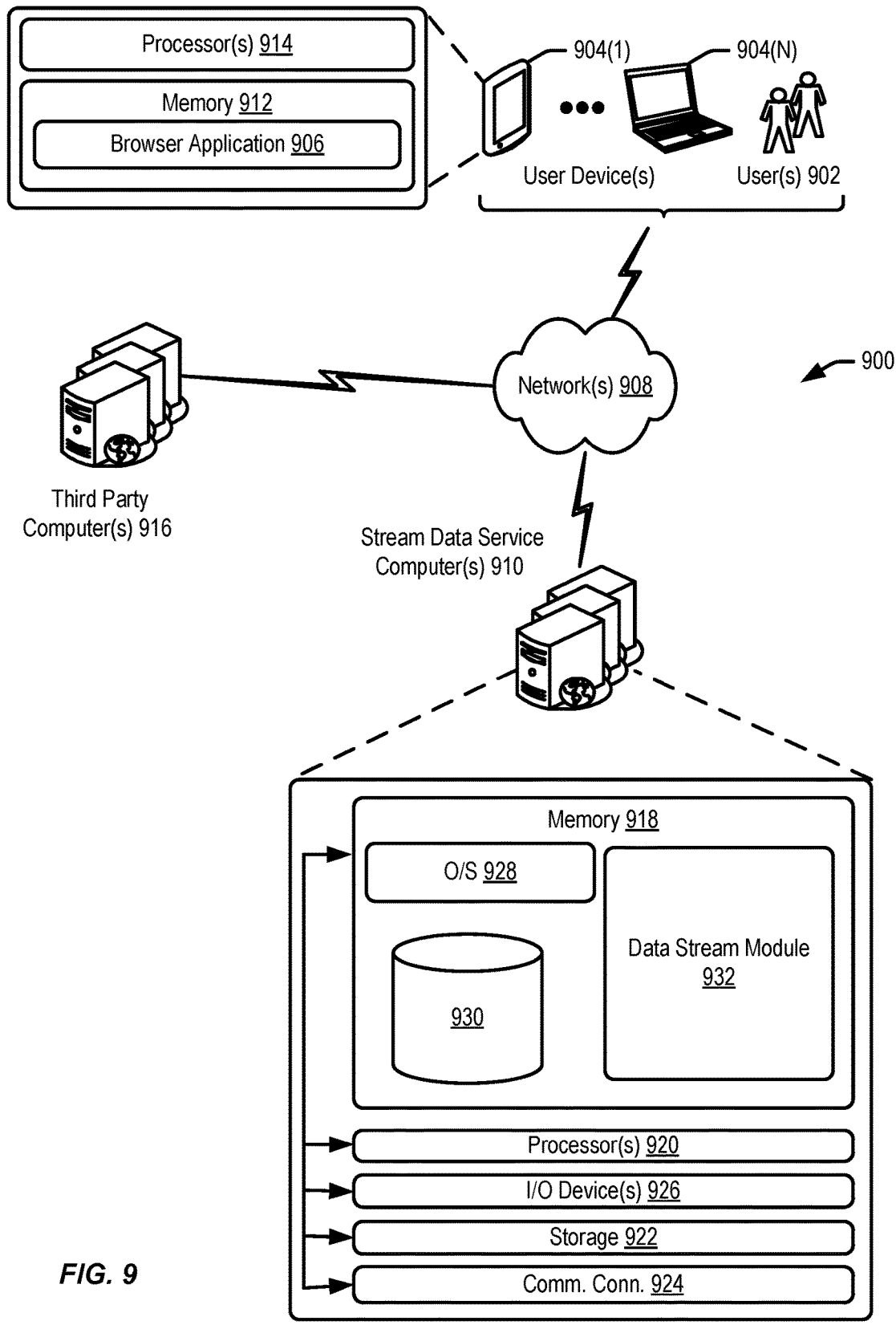
FIG. 9 illustrates an example computer architecture for implementing a streaming data service, according to embodiments.

FIG. 9 illustrates an example computer architecture for implementing a streaming data service, according to embodiments. In architecture 900, one or more users 902 (e.g., users) may utilize user computing devices 904(1)-(N) (collectively, user devices/computing devices 904) to access a browser application 906 (e.g., a web page browser) or a user interface (UI) accessible through the browser application 906, via one or more networks 908 to provide indications associated with a visual media file and be provided B-frames for the visual media file to decrease the eventual data payload associated with the visual media file. The "browser application" 906 can be any browser control or native application that can access and display a web page or other information. In some aspects, the browser application 906 may display information regarding a selection of one or more visual media files and in response to a selection or other input from the user 902 present a decompressed version of the visual media file.

The architecture 900 may also include, one or more stream data service computers 910 that may, in some examples, provide computing resources such as, but not limited to, client entities, low latency data storage, durable data storage, data access, management, virtualization, hosted computing environment or "cloud-based" solutions, electronic content performance management, etc. The one or more stream data service computers 910 may also be operable to provide site hosting, computer application development, and/or implementation platforms, combinations of the foregoing, or the like to the one or more users 902.

In one illustrative configuration, the user computing devices 904 may include at least one memory 912 and one or more processing units or processor(s) 914. The processor(s) 914 may be implemented as appropriate in hardware, computer-executable instructions, firmware, or combinations thereof. Computer-executable instruction or firmware implementations of the processor(s) 914 may include computer-executable or machine-executable instructions written in any suitable programming language to perform the various functions described herein. The user devices 904 may also include geo-location devices (e.g., a global positioning system (GPS) device or the like) for providing and/or recording geographic location information associated with the user devices 904. The memory 912 may store program instructions that are loadable and executable on the processor(s) 914, as well as data generated during the execution of these programs. Depending on the configuration and type of user device 904, the memory 912 may be volatile (such as random access memory (RAM)) and/or non-volatile (such as read-only memory (ROM), flash memory, etc.). The user device 904 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 912 may include multiple different types of memory, such as static random access memory (SRAM), dynamic random access memory (DRAM), or ROM.

Turning to the components of the memory 912 in more detail, the memory 912 may include an operating system and one or more application programs or services for implementing the features disclosed herein including providing a decompressed and appropriately arranged version of a visual media file based at least in part on a B-frame data stream, a P-frame data stream, and an I-frame data stream for the visual media file in response to an indication and/or input for the visual media file. The B, I, and P-frame data streams may be provided by the stream data service computers 910 for eventual presentation to the user 902 via the browser application 906, dedicated applications (e.g., smart phone applications, tablet applications, etc.), or through capabilities inherent to a device (e.g., user interfaces or touch input interfaces). Additionally, the memory 912 may store access credentials and/or other user information such as, but not limited to, user IDs, passwords, and/or other user information. In some examples, the user information may include information for authenticating an account such as, but not limited to, a device ID, a cookie, an IP address, a location, or the like. In addition, the user information may include a user 902 provided response to a security question or a geographic location obtained by the user device 904.

In some examples, the networks 908 may include any one or a combination of many different types of networks, such as cable networks, the Internet, wireless networks, cellular networks and other private and/or public networks. While the illustrated example represents the users 902 communicating with stream data service computers 910 over the networks 908, the described techniques may equally apply in instances where the users 902 interact with the one or more stream data service computers 910 via the one or more user devices 904 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

As described briefly above, the browser application 906 may allow the users 902 to view and interact with a network document that includes information about one or more visual media files associated with the stream data service computers 910. The browser application 906 may be capable of handling requests from many users 902 and serving, in response, various user interfaces that can be rendered at the user devices 904 such as, but not limited to, a network site or web page. The browser application 906 can interact with any type of network site that supports user interaction, including social networking sites, electronic retailers, informational sites, blog sites, search engine sites, news and entertainment sites, electronic marketplaces, and so forth. The described techniques can similarly be implemented outside of the browser application 906, such as with other applications running on the user device 904. In some examples, the one or more stream data service computers 910 may communicate with one or more third party computers 916 to provide various frame data streams or provide a selection of visual media files as described herein.

The one or more stream data service computers 910 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more stream data service computers 910 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment or distributed computing environment. In some examples, the one or more stream data service computers 910 may be in communication with the user device 904 via the networks 908, or via other network connections. The one or more stream data service computers 910 may include one or more servers, perhaps arranged in a cluster or as individual servers not associated with one another.

In one illustrative configuration, the one or more stream data service computers 910 may include at least one memory 918 and one or more processing units or processors(s) 920. The processor(s) 920 may be implemented as appropriate in hardware, computer-executable instructions, firmware, or combinations thereof. Computer-executable instruction or firmware implementations of the processor(s) 920 may include computer-executable or machine-executable instructions written in any suitable programming language to perform the various functions described when executed by a hardware computing device, such as a processor. The memory 918 may store program instructions that are loadable and executable on the processor(s) 920, as well as data generated during the execution of these programs. Depending on the configuration and type of the one or more stream data service computers 910, the memory 918 may be volatile (such as RAM) and/or non-volatile (such as ROM, flash memory, etc.). The one or more stream data service computers 910 or servers may also include additional storage 922, which may include removable storage and/or non-removable storage. The additional storage 922 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918, the additional storage 922, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 918 and the additional storage 922 are all examples of non-transitory computer storage media. Additional types of non-transitory computer storage media that may be present in the one or more stream data service computers 910 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more stream data service computers 910. Combinations of any of the above should also be included within the scope of non-transitory computer-readable media.

The one or more stream data service computers 910 may also contain communication connection interface(s) 924 that allow the one or more stream data service computers 910 to communicate with a data store, another computing device or server, user terminals and/or other devices on the networks 908. The one or more stream data service computers 910 may also include I/O device(s) 926, such as a keyboard, a mouse, a pen, a voice input device, a touch input device, a display, speakers, a printer, etc.

Turning to the contents of the memory 918 in more detail and as was described above in further detail in FIG. 6, the memory 918 may include an operating system 928, one or more data stores 930, and/or one or more application programs or services for implementing the features disclosed herein including a data stream module 932 (which may be an example of data stream module 600). In accordance with at least one embodiment, the data stream module 932 may be configured to at least maintain B-frames, I-frames, and P-frames for a plurality of visual media files, transmit B-frames for a particular visual media file in response to an indication from a computing device, transmit the appropriate P-frames and I-frames for the particular visual media file in response to a input associated with the particular visual media file, and generate and transmit interleave instructions that indicate how to decompress and arrange the data included in the B-frames, I-frames, and P-frames for the particular visual media file to present a decompressed and appropriately arranged version of the particular visual media file to a user.

Figure 10:
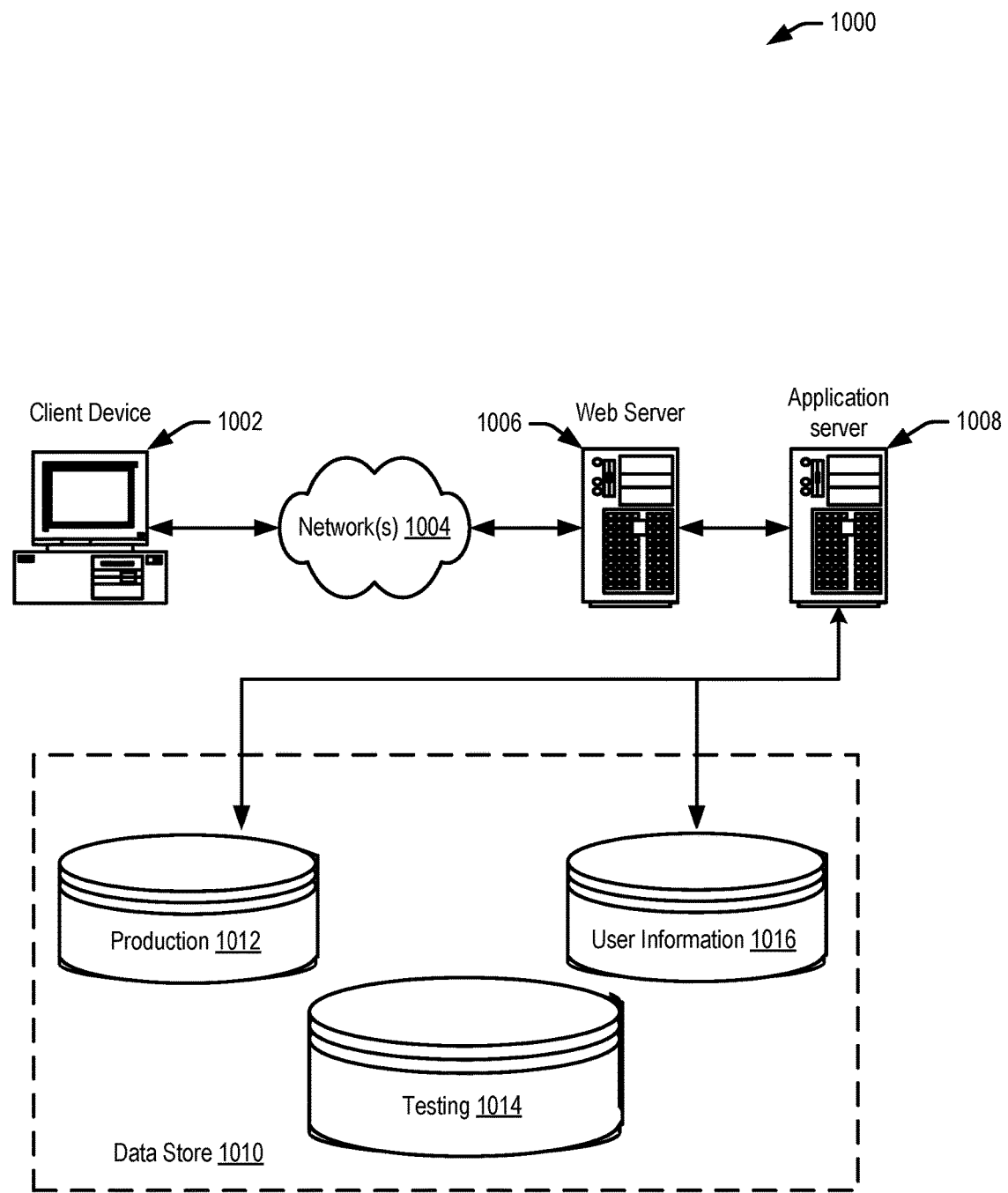
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, by a computer system and from a computing device, an indication of an interaction with a visual media file;
transmitting, by the computer system to the computing device, a third type of frame data of the visual media file for local storage based at least in part on the indication, the third type of frame data being configured to reference both an earlier reference frame than the third type of frame data and a later frame than the third type of frame data for the visual media file; and
in response to receiving information that identifies a selection of the visual media file via a user interface associated with the computing device:
transmitting, by the computer system over a network, a first type of frame data of the visual media file and a second type of frame data of the visual media file to the computing device subsequent to transmitting the third type of frame data; and
transmitting instructions to the computing device that instruct the computing device to interleave the locally stored third type of frame data of the visual media file, the first type of frame data of the visual media file, and the second type of frame data of the visual media file according to a frame arrangement associated with the visual media file, the instructions causing presentation of a decompressed version of the visual media file to the user computing device based at least in part on the interleaved third type of frame data, the first type of frame data, and the second type of frame data.

2. The computer-implemented method of claim 1, wherein the third type of frame data, the first type of frame data, and the second type of frame data of the visual media file are compressed.

3. The computer-implemented method of claim 1, further comprising obtaining location information associated with the computing device.

4. The computer-implemented method of claim 3, further comprising transmitting the third type of frame data of the visual media file to a proxy server based at least in part on the location information associated with the computing device.

5. The computer-implemented method of claim 1, wherein the interaction comprises at least one of an action by a user with a graphical representation of the visual media file presented via the computing device, selecting, by the user, a trailer for the visual media file via the computing device, or querying, by the user, for additional information associated with the visual media file via the computing device.

6. The computer-implemented method of claim 1, wherein transmitting the third type of frame data of the visual media file to the computing device is further based at least in part on factors associated with the visual media file, the factors corresponding to a recommended list of visual media files, or a trending list of the visual media files.

7. A client device comprising:
a processor; and
a memory including instructions that, when executed with the processor, cause the client device to, at least:
transmit, to a streaming service, an indication of an interaction with a particular visual media file;
receive at the client device a third type of frame data for the particular visual media file from the streaming service, the third type of frame data being configured to reference both an earlier reference frame than the third type of frame data and a later frame than the third type of frame data for the particular visual media file;
transmit selection of the particular visual media file to the streaming service;
request, by making an application program interface call to an interface associated with the client device, a first data stream of a first type of frame data for the particular visual media file and a second data stream of a second type of frame data for the particular visual media file to interleave with the third type of frame data for the particular visual media file, the request based at least in part on the selection of the particular visual media file and subsequent to transmitting the third type of frame data; and
interleave the third type of frame data, the first data stream of the first type of frame data, and the second data stream of the second type of frame data based at least in part on instructions from the interface.

8. The client device of claim 7, wherein the instructions, when executed with the processor, further cause the system to present a decompressed version of the particular visual media file to a display device based at least in part on the interleaved third type of frame data, the first data stream of the first type of frame data, and the second data stream of the second type of frame data for the particular visual media file.

9. The client device of claim 7, wherein the interface comprises at least a front-end that is configured to respond to data access requests from the client device, the data access requests including the API call.

10. The client device of claim 7, wherein the interface comprises at least a back-end that is configured to receive and process the first data stream of the first type of frame data and the second data stream of the second type of frame data for the particular visual media file based at least in part on the selection of the particular visual media file.

11. The client device of claim 7, wherein the instructions from the interface to interleave the third type of frame data, the first data stream of the first type of frame data, and the second data stream of the second type of frame data is based at least in part on metadata associated with each frame comprising the particular visual media file.

12. The client device of claim 7, wherein the third type of frame data is compressed utilizing an H.264 compression technique.

13. A non-transitory computer-readable medium storing computer-executable instructions that, when executed by a processor, cause a computer system to at least:

transmit a third type of frame data for a visual media file to a computing device for storage based at least in part on user preferences associated with the computing device, the third type of frame data being configured to reference both an earlier reference frame than the third type of frame data and a later frame than the third type of frame data for the visual media file;

transmit, over a network, a first data stream of a first type of frame data of the visual media file and a second data stream of a second type of frame data of the visual media file to the computing device based at least in part on input from the computing device and subsequent to transmitting the third type of frame data;

instruct the computing device to interleave the third type of frame data, the first data stream of the first type of frame data, and the second data stream of the second type of frame data of the visual media file, the third type of frame data accessed from storage on the computing device; and transmit instructions to present an interleaved version of the visual media file comprising the third type of frame data, the first data stream of the first type of frame data, and the second data stream of the second type of frame data of the visual media file.

14. The non-transitory computer-readable medium of claim 13, wherein portions of third type of frame data are compressed utilizing a shared dictionary compression technique.

15. The non-transitory computer-readable medium of claim 14, wherein the shared dictionary compression technique includes identifying similar objects with similar vectors in the portions of the third type of frame data.

16. The non-transitory computer-readable medium of claim 13, wherein transmitting the third type of frame data for the visual media file is based at least in part on factors associated with a user that is associated with the computing device and including at least user browsing history or a recommendation generated by an electronic marketplace for the user.

17. The non-transitory computer-readable medium of claim 16, wherein transmitting the third type of frame data for the visual media file is further based at least in part on a confidence value associated with the recommendation exceeding a threshold for the visual media file.

18. The non-transitory computer-readable medium of claim 13, wherein the third type of frame data for the visual media file is encrypted and, wherein transmitting the first data stream of the first type of frame data and the second data stream of the second type of frame data of the visual media file includes providing a key that is generated based at least in part on the input from the computing device.

19. The non-transitory computer-readable medium of claim 13, wherein transmitting the third type of frame data for the visual media file to the computing device is based at least in part on an indication that corresponds to a type of the computing device.

* * * * *